United States Patent [19]

Ito et al.

[11] Patent Number: 6,085,019
[45] Date of Patent: *Jul. 4, 2000

[54] APPARATUS AND METHOD FOR RECORDING AND REPRODUCING VIDEO DATA TO AND FROM A RECORD MEDIUM

[75] Inventors: Norikazu Ito; Hiroyuki Fujita; Yuichi Kojima, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/708,550

[22] Filed: Sep. 5, 1996

[30] Foreign Application Priority Data

Sep. 8, 1995 [JP] Japan ................... 7-231499

[51] Int. Cl.[7] ............... H04N 5/93; G11B 27/00
[52] U.S. Cl. ................... 386/52; 386/83; 348/8
[58] Field of Search ................... 386/1, 45, 46, 386/52, 69, 70, 124, 125, 126, 83; 360/69; 348/8, 423; 455/6.2, 6.3

[56] References Cited

U.S. PATENT DOCUMENTS

| | | | |
|---|---|---|---|
| 5,442,390 | 8/1995 | Hooper et al. | 348/7 |
| 5,647,047 | 7/1997 | Nagasawa | 386/52 |
| 5,719,985 | 2/1998 | Ito et al. | 386/109 |
| 5,793,927 | 8/1998 | Lane | 386/81 |

*Primary Examiner*—Wendy Garber
*Assistant Examiner*—Christopher Onuaku
*Attorney, Agent, or Firm*—Frommer Lawrence & Haug, LLP.; William S. Frommer

[57] ABSTRACT

Apparatus and corresponding method for recording and reproducing video data to and from a record medium operate to communicate with plural external devices. The recording/reproducing apparatus includes plural audio/video data input/output devices each of which is programmable and coupled to a respective external device for receiving video data therefrom and transmitting reproduced video data thereto. Each input/output device is operable to receive a recording or reproducing external request signal from the respectively coupled external device, generate a respective recording/reproducing request signal in response thereto, output the request signal, receive data reproduced from a record medium during a reproducing operation and supply the reproduced data to the external device, and receive video data from the external device during a recording operation and supply the video data for recording on the record medium. A storage control device receives the reproduction and recording request signals and supplies appropriate reproduction and recording control signals in response thereto to the respective input/output device which output the original request signal. The respective input/output device supplies to a storage device appropriate recording/reproduction initiate signals and the storage device either records or reproduces video data to or from the record medium in accordance with the supplied initiate signal, and outputs, during the reproducing operation, the reproduced video data to the respective input/output device which output the reproduction initiate signal.

28 Claims, 6 Drawing Sheets

APPARATUS AND METHOD FOR RECORDING AND REPRODUCING VIDEO DATA TO AND FROM A RECORD MEDIUM

BACKGROUND OF THE INVENTION

The present invention relates to apparatus and method for recording and reproducing digital video and audio data to and from a record medium and, more particularly, to a recording/reproducing device which is operable to receive and transmit video data from and to multiple external devices.

As is known, television broadcasting stations produce television programs by imaging video images to produce video signals (e.g., using a television camera), recording the video signals on magnetic tape using video tape recorders, editing, if necessary, the video signals stored on the magnetic tape, assembling the edited or unedited video signals, and recording the assembled video signals on a magnetic tape for broadcast at a later time. Generally, there is a relatively large amount of unassembled video signals stored on magnetic tape (commonly called "raw footage") and, thus, it is typical that the process of selecting and editing desired "footage" is slow and inefficient. In addition, a large amount of magnetic tape is not easily moved between editing rooms and video signals stored on the same magnetic tape cannot easily be processed (i.e., edited) by different editing devices at the same time.

It is common for a television program, for example, a news program, to be recorded on a magnetic tape and be loaded into a video tape recorder (or a cart machine having a video tape recorder therein) prior to transmitting the program recorded thereon. One difficulty encountered in such an arrangement is the general inability to quickly and efficiently modify the video signal that is about to be transmitted.

Another device, known as a "server system", is used to centrally manage the "raw footage" so that it can be more easily edited, assembled and transmitted. FIG. 1 is a block diagram of a server system 4 which is utilized to transmit and receive video and audio data to and from multiple external devices. As shown, server system 4 is comprised of a central processing unit (CPU) 401, a read only memory (ROM) 402, a random access memory (RAM) 403, a high speed bus 404, plural recording/reproducing devices $406_1$–$406_m$, various interface devices $405_1$–$405_m$ and $407_1$–$407_n$, audio/video data compression devices $S40_1$–$S40_n$, and audio/video data decompression devices $S43_1$–$S43_n$. In addition, a LAN interface 411 is provided for server system 4 to interface with a LAN 410 when the server system is not connected directly to the specific application system utilized.

Video and audio data to be recorded on a magnetic tape are supplied from an external device (not shown in FIG. 1) to one of the compression devices 408 which compresses the supplied data in a manner well known in the art and which supplies the compressed data via interface 407 to bus 404. The compressed data on bus 404 is stored temporarily in RAM 403 SO that the rate of data transfer can be controlled and the data stored in RAM 403 is supplied via bus 404 and interface device 405 to one of the recording/reproducing devices 406 which records the compressed video and audio data on a magnetic tape contained therein. During a reproduction operation of server system 4, video and audio data recorded on a magnetic tape is reproduced therefrom in one of the recording/reproducing devices 406 and supplied via interface 405 and bus 404 to RAM 403 which stores temporarily the reproduced data therein. The stored data is output from RAM 403 and supplied via bus 404 and interface 407 to one of the decompression devices 409 which decompresses the reproduced data and which supplies the decompressed data to an external device, for example, a data editing device (not shown in FIG. 1).

In response to instructions supplied via LAN 410 from an application system (not shown), CPU 401 controls the various devices of server system 4 in a manner well known in the art. Server system 4 further may include control lines $S44_1$–$S44_n$ which transmit and receive control signals to and from the external devices and CPU 401 controls the operation of server system 4 in accordance with those control signals.

One difficulty encountered in typical server systems is the general inability to increase the number of external devices that can be coupled thereto. That is, server system 4 is not easily expandable beyond a set number of interfaces connected thereto due to the limited bandwidth of its data bus. As is known, digital video/audio signals have a bit rate of at least 100 Mbps (million bits per second) and compression encoded video/audio data have a bit rate of 30 Mbps. If a server system, such as shown in FIG. 1, includes eight editing devices which are used simultaneously to edit (e.g., AB roll edit) two magnetic tapes having raw footage thereon, the raw footage has a bit rate of 30 Mbps (or approximately 4 million bytes per second (MBps)), and the video/audio data is buffered in RAM 403 as discussed above, then 48 "sets" of encoded audio/video data simultaneously are transmitted, at a maximum, on bus 404. That is, each of the 8 editors is responsible for reproducing 2 sets of raw footage and recording (in server system 4) an edited video signal for a total of 3 sets of audio/video data per editor, and each set is stored in RAM 403 and subsequently output therefrom. Thus, 6 sets of audio/video data may be transmitted on bus 404 for each editing device, for a total of 48 sets. If each of the 48 sets of audio/video data has a byte rate of 4 MBps, then bus 404 must have a transmission rate of at least 192 MBps to ensure that 8 editing devices can operate to edit the audio/video signals simultaneously. However, since the data bus of a typical high performance server system has a transmission rate of approximately 100 MBps, it is not possible or, at least, not efficient to utilize 8 editing devices therewith.

Another difficulty encountered in typical server systems is their general inability to ensure that interruptions in transmission of audio/video data to an external device does not occur. This is particularly important when the external device is a broadcast transmission system which is currently transmitting a television program.

A further difficulty encountered in typical server systems is their general inability to communicate in a synchronous manner with television broadcasting equipment that typically operate in synchronization with one another. A server system which utilizes a central processing unit and which has the block structure shown in FIG. 1 operates in an asynchronous manner, whereas it is necessary that the audio/video data that is transmitted between the server system and external broadcasting equipment be in synchronization. This, however, is not easily achieved in the above discussed server systems. Although synchronization may be achieved by synchronizing each of the signals to be output in synchronous/asynchronous converters contained within the server system, providing such a converter for each of these interfaces substantially increases both the size and cost of the server system.

Another problem encountered in the above-discussed service system is that transmissions by bus 404 and RAM 403 cause delays in transfer between the recording/reproducing devices, the interfaces 407 and the external devices. These delays require that data supplied from and transmitted to interface devices 405 and 407 be buffered in RAM 403 during both reproduction and recording operations of the system server thus making it difficult to satisfy any "response performance requirements" of the external devices. Also, the inherent delays of the asynchronous devices of the server system generally vary as a function of both time and temperature and, thus, synchronizing the output of the server system is quite difficult to carry out.

As previously discussed, server system 4 may be controlled by utilizing control signals supplied over control lines $S44_1$ to $S44_n$. However, control signals supplied via control lines $S44_1$ to $S44_n$ to interface devices $407_1$ and $407_n$ must be transmitted via the asynchronous bus 404 to CPU 401 and back over the asynchronous bus 404 to the various devices in the server system and, thus, synchronization cannot simply be achieved by synchronizing the control signals supplied to the server system.

OBJECTS OF THE INVENTION

Therefore, it is an object of the present invention to provide apparatus and method for recording and reproducing video data to and from a record medium which overcome the shortcomings of the above-described devices.

Another object of the present invention is to provide apparatus for recording and reproducing video data which is expandable in that the number of external devices to which the apparatus is coupled may be easily increased.

A further object of the present invention is to provide a recording/reproducing apparatus which may be synchronized to a reference synchronization signal.

An additional object of this invention is to provide a recording/reproducing apparatus which adds time codes to video signals that are to be recorded on a record medium.

Still another object of the present invention is to provide a recording/reproducing apparatus which has a relatively small system delay and which may be directly and efficiently controlled by externally supplied control signals.

A still further object of this invention is to provide a recording/reproducing apparatus which provides synchronous/asynchronous conversion in a simple and efficient manner.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus (and corresponding method) is comprised of a reproducing device (e.g., plural hard drives) which reproduces video data from a record medium in accordance with a reproducing request control signal, and a plurality of output control devices each of which includes a programmed control device which outputs a respective reproducing request control signal in response to the receipt of an external reproduction request supplied by a respective external device (e.g. a video data editing device or an on-air type device) that is coupled to the respective output control device. The reproducing request control signal that is output from one of the output control devices is supplied over a control bus to the reproducing device, and video data that is reproduced by the reproducing device is supplied over a data bus to the respective output control device which output the reproducing request control signal.

As one aspect of the present invention, the external reproduction request identifies desired video data to be reproduced from the record medium, and the reproducing request control signal identifies an address in the record medium at which the desired video data is located.

As another aspect of the present invention, each output control device is operable to decompress compressed video data that is reproduced from the record medium.

As yet a further aspect of the present invention, a server manager system supplies respective management control signals to each of the output control devices in accordance with a predetermined reproduction schedule, and the output control devices supply respective output control signals corresponding to the supplied respective management control signals to the respectively coupled external devices.

As yet another aspect of the present invention, an asynchronous to synchronous converter converts an asynchronous signal output from the reproducing device to a synchronous signal so that an amount of time between the output of the reproducing request control signal from a respective output control device and receipt of the reproduced video data by the respective output control device is constant.

In accordance with another embodiment of the present invention, apparatus is comprised of a plurality of programmed input/output control devices each of which receives a respective external request signal from a respective external device, generates a respective reproduction request signal in response to receipt of the respective external request signal and outputs the respective reproduction request signal. Each of the programmed input/output control devices also receives reproduced data and outputs the received reproduced data to the respective external device. A storage control device receives the reproduction request signal and supplies a reproduction control signal in response thereto to the respective programmed input/output control device which outputs the reproduction request signal. The respective programmed input/output control device supplies in response to the reproduction control signal a reproduction initiate signal to a storage device which reproduces video data from a record medium therein in accordance with the reproduction initiate signal and which outputs the reproduced video data to the respective programmed input/output control device which output the reproduction initiate signal.

In accordance with a further embodiment of the present invention, apparatus (and corresponding method) is comprised of a plurality of input control devices each of which includes a programmed control device which outputs a respective recording request control signal in response to receipt of an external recording request supplied by a respective external device (e.g. a video data editing device, a video tape recorder and a camera) coupled to the respective input control device, and receives video data from the respective external device, and a recording device which records the supplied video data onto a record medium in accordance with the recording request control signal. The recording request control signal output from one of the input control devices is supplied over a control bus to the recording device, and the video data received by the one of the input control devices is supplied over a data bus to the recording device.

In accordance with still another embodiment of the present invention, apparatus is comprised of a plurality of programmed input/output control devices each of which receives a respective external request signal from a respective external device, generates a respective recording request signal in response to receipt of the respective external request signal and outputs the respective recording request signal. Each programmed input/output control device further receives video data from the respective external device and outputs the received video data. A storage control device receives the recording request signal and supplies a recording permit signal in response thereto to the respective programmed input/output control device which output the recording request signal. The respective programmed input/output control device supplies in response to the recording permit signal the received video data to the storage device, and the storage device records the video data output by a respective one of the programmed input/output control devices on a record medium.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
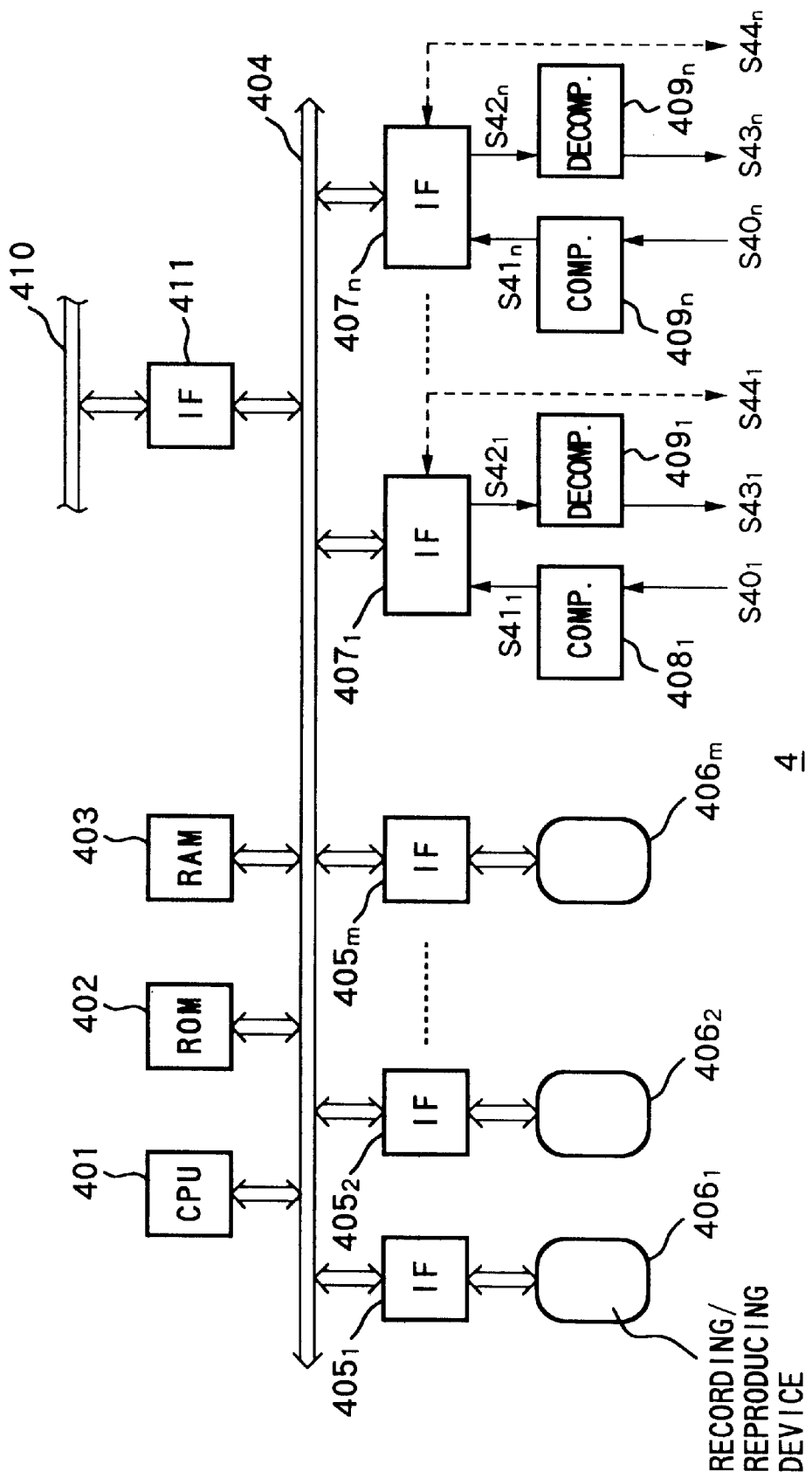
FIG. 1 is a block diagram of a server system.
Figure 2:
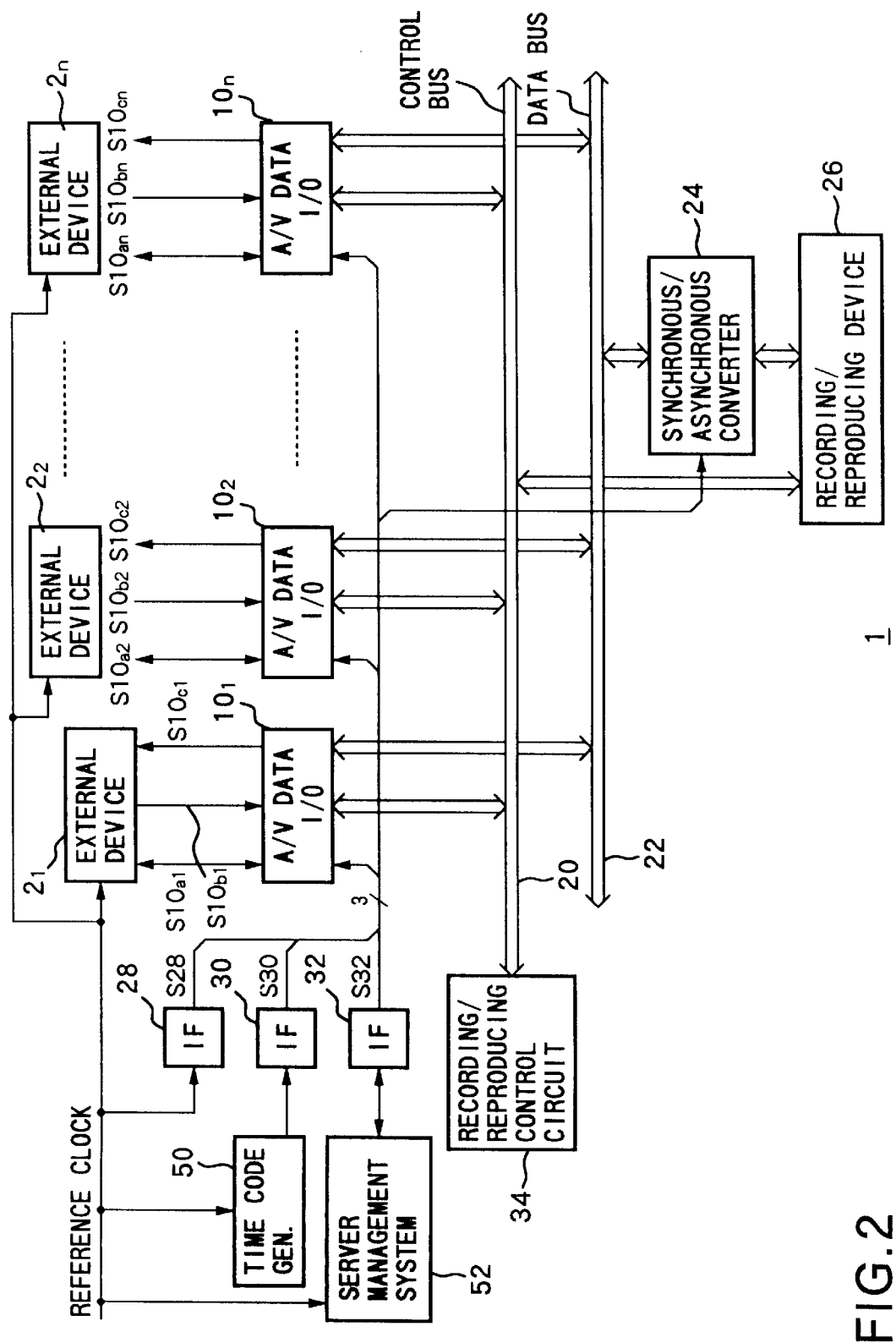
Fig. 2 is a block diagram of apparatus for recording and reproducing video data to and from a record medium in accordance with the present invention.

Referring now to FIG. 2 of the drawings, a block diagram of apparatus for recording and reproducing video data to and from a record medium in accordance with the present invention is shown. The apparatus of the present invention (hereinafter recording/reproducing apparatus 1) is comprised of N audio/video data input/output (A/V data I/O) devices $10_1$ to $10_n$, a recording/reproducing control circuit 34, a synchronous/asynchronous converter 24, a recording/reproducing device 26, a synchronization signal interface (IF) 28, a time code interface 30 and a multiplexing control interface 32. Recording/reproducing apparatus 1 also is comprised of a control bus 20 connected to each of the A/V data I/O devices $10_1$ to $10_n$, synchronous/asynchronous converter 24, recording/reproducing control circuit 34, and recording/reproducing device 26, and a data bus 22 which is connected to each of the data I/O devices $10_1$ to $10_n$ and synchronous/asynchronous converter 24.

A reference clock signal is supplied from an external source to interface 28 which supplies the reference signal as a synchronization signal S28 to each of the data I/O devices as well as to the synchronous/asynchronous converter 24. A time code generator 50, which may be included in the recording/reproducing apparatus of the present invention or an external device thereof, is synchronized by the reference clock, as shown, and supplies generated time codes to interface 30 which supplies the generated time codes S30 to each of the data I/O devices and the synchronous/asynchronous converter 24. A server management system 52, also which may be included in the apparatus of the present invention or external thereto, produces control signals to control the operation of the present invention (to be discussed) and which supplies the control signals as a "package" control signal S32 to interface 32 which supplies the supplied signal to each of the data I/O devices and synchronous/asynchronous converter 24.

As shown in FIG. 2, each of the data I/O devices $10_1$ to $10_n$ on may be coupled to a respective external device $2_1$ to $2_n$. An external device 2 that is coupled to the apparatus of the present invention may be a video editing system, a data input device, a data device, an "on-air" device, e.g., a broadcast transmission system, or any other suitable device to which the present invention may be coupled. For example, external device $2_1$ may be a video editor, external device $2_2$ may be an "on-air" device, etc. Since these devices typically are synchronous-type devices, they are provided with the same reference clock signal that is provided to recording/reproducing apparatus 1 of the present invention.

Figure 3:
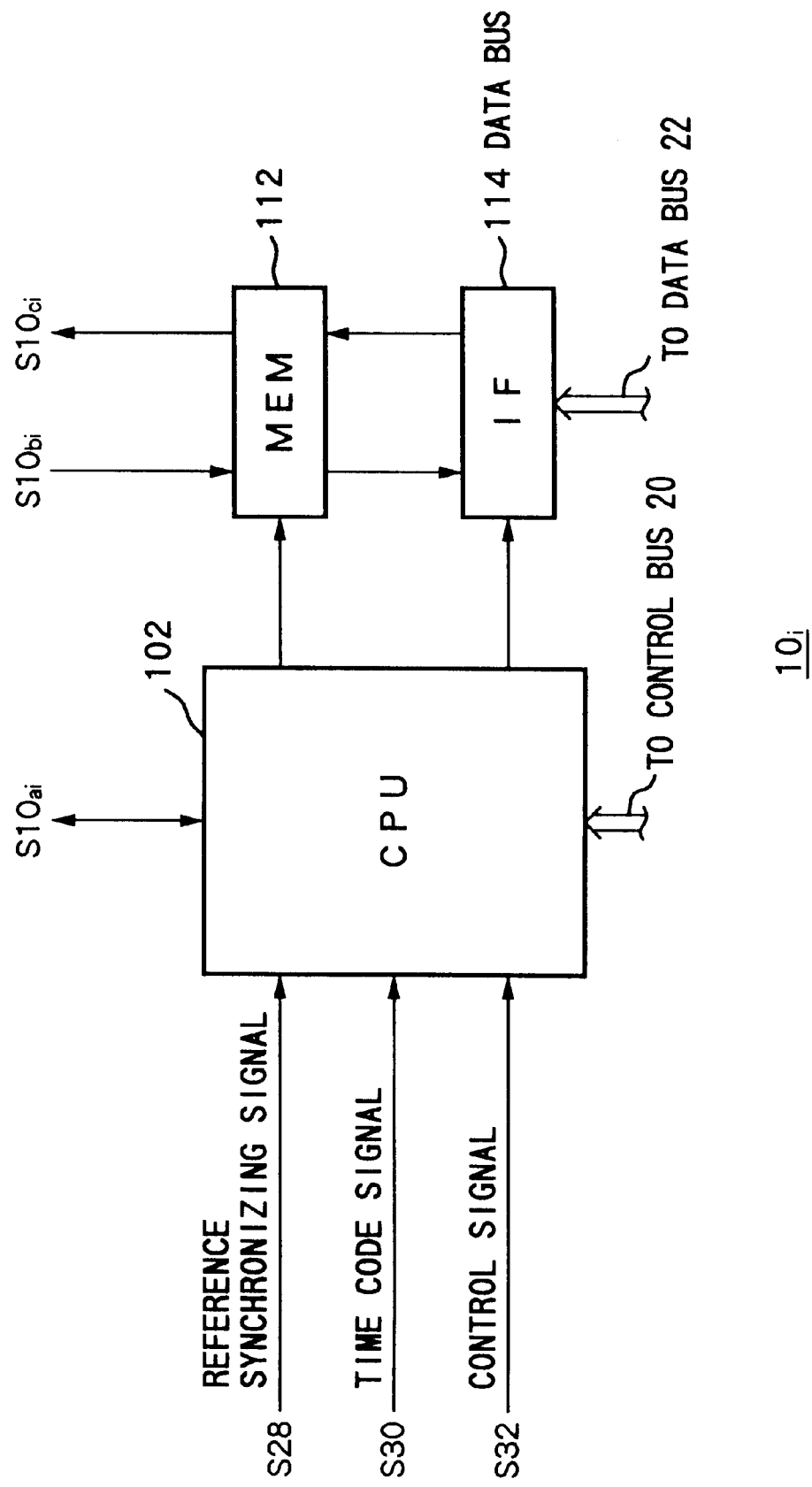
FIG. 3 is a block diagram of the A/V data I/O device 10 shown in FIG. 2.

In accordance with the present invention, each data I/O device $10_1$ to $10_n$ is shown in block diagram form in FIG. 3 and is comprised of a central processing unit (CPU) 102, a memory 112 and a data bus interface 114. For purposes of the present discussion, $10_i$ represents the ith data I/O device wherein i can have a value of 1 to n. The "i" in the signal designations similarly represent the signals input and output to and from the ith data I/O device.

Each of the data I/O devices $10_1$ to $10_n$ (hereinafter simply "data I/O device 10") transmits and receives a control signal $S10_a$ to and from a respective external device 2 that is coupled thereto. Data I/O device 10 further transmits and receives control signals to and from recording/reproducing control circuit 34 via control bus 20. CPU 102 in each data I/O device 10 controls memory 112 and data bus interface 114 in response to the control signals supplied from recording/reproducing control circuit 34, and in response to the control signal $S10_a$ supplied from the external device 2 and, if necessary, in response to reference synchronization signal S28, time code S30 and package control signal S32. Essentially, CPU 102 controls the transfer of video and audio data between the external device 2 and recording/reproducing device 26.

Data bus interface 114 interfaces the flow of data between recording/reproducing device 26 (via data bus 22) and external device 2 (via memory 112) and this interface is controlled by CPU 102. Memory 112 is a buffer and temporarily stores video and audio data supplied as signal $S10_b$ from external device 2 and supplies the data stored therein via data bus interface 114, data bus 22 and synchronous/asynchronous converter 24 (to be discussed) to recording/reproducing device 26. In addition, memory 112 temporarily stores video and audio data reproduced by recording/reproducing device 26 and supplies the stored data to external device 2.

Referring back to FIG. 2, recording/reproducing control circuit 34 operates to control each of the data I/O devices $10_1$ to $10_n$, synchronous/asynchronous converter 24 and recording/reproducing device 26 in a manner to be discussed. During a recording operation of the present invention in which video and audio data supplied from one of the external devices 2 is to be recorded on a record medium included in recording/reproducing device 26, recording/reproducing control circuit 34 designates the address location of the record medium at which the video and audio data is to be recorded. During a reproducing operation of the present invention, recording/reproducing control circuit 34 identifies the memory location of the record medium at which specific desired data is already recorded and subsequently supplies appropriate control signals to the appropriate data I/O device 10 in order for the selected video and audio data to be reproduced from the record medium and subsequently supplied to the particular external device 2 that requested the video and audio data. These operations of the present invention will be further discussed with reference to FIGS. 4 and 5 of the drawings.

Figure 4:
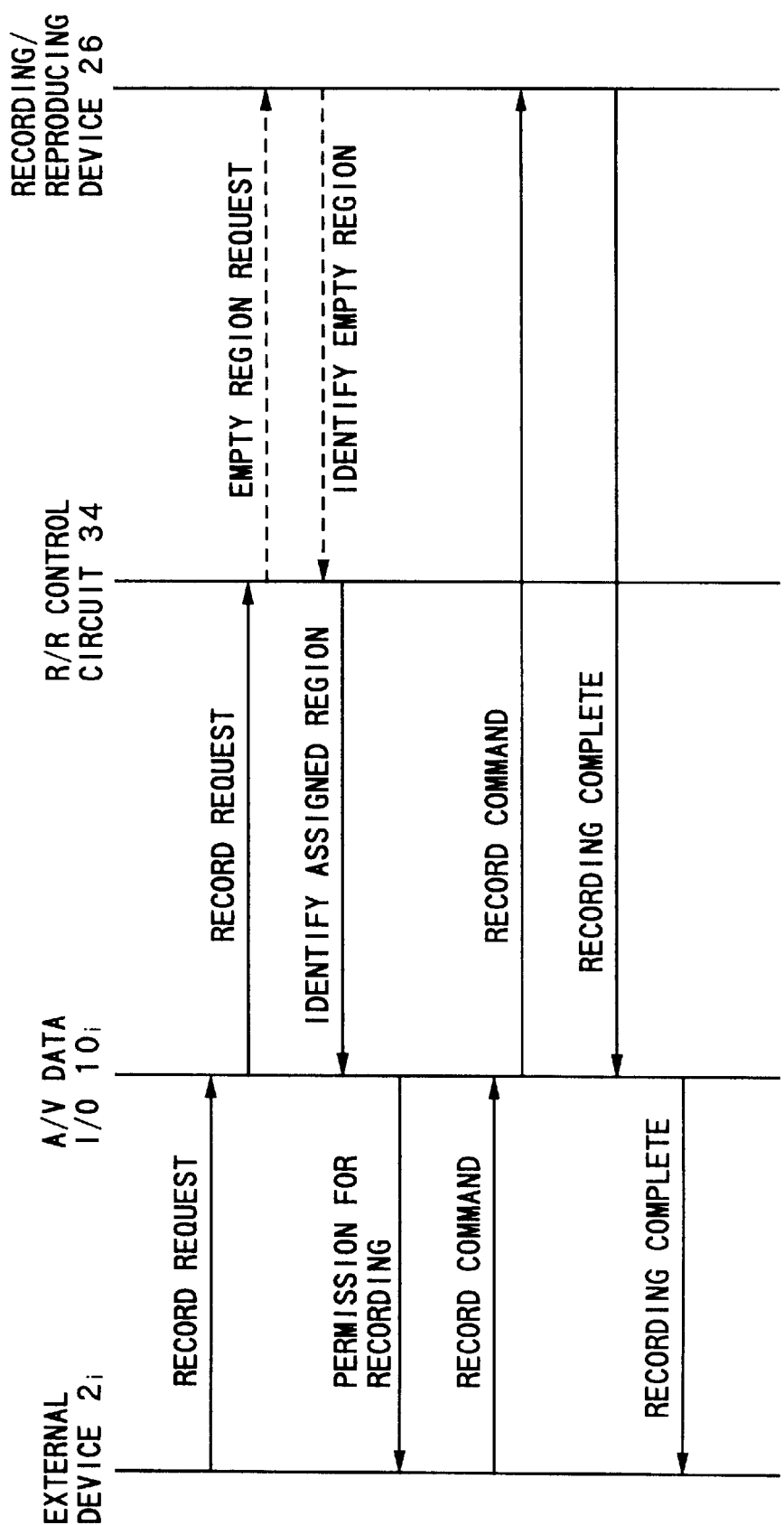
FIG. 4 is a signal flow diagram illustrating the flow of various control signals to the various devices of the apparatus of the present invention during a recording operation.

Referring first to FIG. 4, a signal flow diagram illustrating the flow of various control signals between the various devices of the apparatus of the present invention during a recording operation is shown. When it is desired to record a video signal on the record medium included in recording/reproducing device 26, an external device 2 supplies an appropriate record request signal (S10a) to the data I/O device 10 to which it is coupled and, in response thereto, data I/O device 10 supplies the same record request signal or a different (and corresponding) request signal via control bus 20 to recording/reproducing control circuit 34. Recording/reproducing control circuit 34, in turn, "searches" for an "empty" (or available) recording region of the record medium and supplies to the data I/O device 10 an assigned region identification control signal which identifies the region (i.e. memory address) of the record medium at which the video and audio data is to be recorded. In accordance with one embodiment of the present invention, recording/reproducing control circuit 34 includes therein a memory which contains an index or suitable "table of contents" of the data stored on the record medium so that control circuit 34 is operable to identify an address of the record medium at which new video and audio data may be recorded. In an alternative embodiment of the present invention, recording/reproducing control circuit 34 is unable to identify such an address in the record medium or, alternatively, request a verification of such an address and, thus, supplies an "empty region request" control signal to recording/reproducing device 26 which requests that device 26 identify a region (i.e., memory address) of the record medium therein which is empty or available. Recording/reproducing device 26 supplies an identification control signal back to recording/reproducing control circuit 34 which, in response thereto, supplies an assigned region identification signal similar to that previously discussed to data I/O device 10. Data I/O device 10, in response to receiving the assigned region identification signal, supplies an appropriate recording permission signal as control signal S10a to the external device 2 which supplied the original request signal.

External device 2, after receiving the recording permission signal, supplies to data I/O device 10 a record command as control signal S10a and subsequently supplies to data I/O device 10 the video and audio data as data signal S10b. Data I/O device 10 supplies the record command signal via control bus 20 to recording/reproducing device 26 and subsequently supplies the video and audio data supplied thereto via data bus 22 to synchronous/asynchronous converter 24 which operates to synchronize the signal (to be discussed) and to supply the video and audio data to recording/reproducing device 26 which records the supplied data on the record medium therein at the memory address as identified in the record command signal. Upon completion of recording the video and audio data on the record medium, recording/reproducing device 26 supplies an appropriate recording complete control signal via control bus 20 to data I/O device 10 (i.e., the same data I/O device 10 which supplied all of the previous control signals and video and audio data to recording/reproducing device 26). Data I/O device 10 then notifies external device 2 that the recording operation is complete by supplying either the same recording complete control signal or a different control signal as control signal S10a to the external device.

Figure 5:
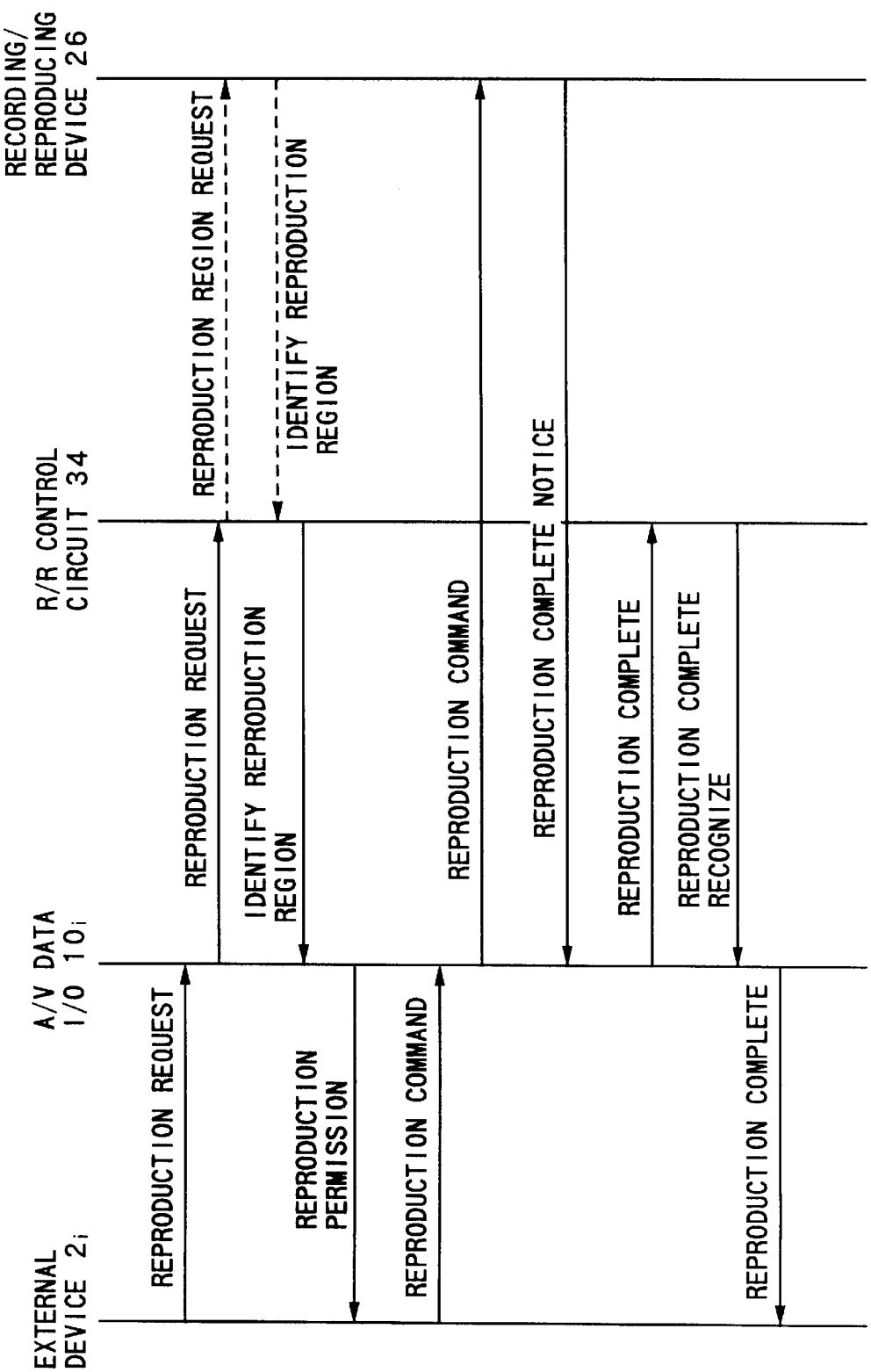
FIG. 5 is a signal flow diagram illustrating the flow of various control signals to the various devices of the apparatus of the present invention during a reproducing operation.

Referring now to FIG. 5, a signal flow diagram illustrating the flow of various control signals to the various components of the apparatus of the present invention during a reproducing operation is shown. When it is desired to reproduce a particular video segment recorded on the record medium in recording/reproducing device 26, for example, as when external device 2 is a video editor which has been controlled (by a user) to edit particular recorded video data, external device 2 supplies an appropriate reproduction request control signal (S10a) to the data I/O device 10 to which the external device 2 is coupled. Data I/O device 10, in response to receiving the reproduction request control signal, supplies the reproduction request control signal (or a corresponding control signal) via control bus 20 to recording/reproducing control circuit 34 which, in response thereto, identifies the particular region or memory address of the record medium at which the desired video segment is stored, and supplies a reproduction region identification signal to data I/O device 10 which identifies the memory address to be reproduced. In an alternative embodiment of the present invention, recording/reproducing control circuit 34 supplies via control bus 20 a reproduction region request control signal to recording/reproducing device 26, along with the particular video segment information that is to be reproduced, and, in response thereto, recording/reproducing device 26 identifies the region or memory address of the record medium therein which is to be reproduced (i.e., the memory address which contains the desired video segment) and supplies a reproduction region identification signal via control bus 20 to recording/reproducing control circuit 34. Recording/reproducing control circuit 34 supplies the reproduction region identification signal to data I/O device 10 which, in response thereto, supplies an appropriate reproduction permission control signal as signal S10a to the external device 2 which made the original reproduction request signal.

External device 2, after receiving the reproduction permission control signal, supplies to data I/O device 10 a reproduction command as control signal S10a. Data I/O device 10 supplies the reproduction command, along with the memory address of the region in the record medium to be reproduced, via control bus 22 to recording/reproducing device 26. Recording/reproducing device 26, in response thereto, reproduces the desired video and audio data stored on the record medium therein and supplies the reproduced data via synchronous/asynchronous converter 24 and data bus 22 to data I/O device 10. Data I/O device 10 then supplies the reproduced data as signal S10c to external device 2. Upon completing the reproduction of the desired video and audio data, recording/reproducing device 26 supplies an appropriate reproduction complete control signal via control bus 22 to data I/O device 10 and data I/O device 10 forwards the reproduction complete signal to recording/reproducing control circuit 34 which, in response thereto, supplies a reproduction complete recognition signal back to data I/O device 10 which then supplies a reproduction complete control signal as signal S10a to external device 2.

Referring back to FIG. 2, and as previously discussed, interface 28 receives a reference synchronization signal (e.g., a reference clock signal) from an external source and supplies the synchronization signal to each data I/O device 10 and to synchronous/asynchronous converter 24. Each external device 2 also is supplied with the reference synchronization signal and is synchronized therewith in a manner well known in the art. Since each data I/O device 10 of the apparatus of the present invention operates independent of one another, the devices are easily synchronized to the reference synchronization signal supplied thereto.

Synchronous/asynchronous converter 24 also is synchronized to the referenced synchronization signal and operates to synchronize the input and output of recording/reproducing device 26. That is, synchronous/asynchronous converter 24 establishes an amount of time between the output of a reproduction command signal from a data I/O device 10 and the supplying of video and audio data reproduced from recording/reproducing device 26 on data bus 22 as a constant.

Time code interface 30 supplies a generated time code to each data I/O device 10 and to synchronous/asynchronous converter 24. The generated time codes identify elapsed amount of time of the video and audio data, or indicate the time of display (i.e., transmission) thereof. The time codes may be added to the video and audio signals in a data I/O device 10 prior to being recorded on the record medium. The time codes further may be utilized to establish synchronization between the video and audio data supplied to and transmitted from each external device 2, as well as the output and input of video data from and to recording/reproducing device 26 (by means of synchronous/asynchronous converter 24).

Interface 32 receives package control signals from, for example, server management system 52 which, as previously mentioned, may be a device external to the apparatus of the present invention. The control signals control the operation of each of the data I/O devices $10_1$ to $10_n$. Control signal S32 may represent, for example, a predetermined reproduction schedule which specifies the times at which specified video and audio data stored on the record medium are to be reproduced.

Therefore, it is possible to control each of the data I/O devices $10_1$ to $10_n$, synchronous/asynchronous converter 24, and recording/reproducing device 26 in a manner in accordance with any of the control signals S28, S30, S32. Namely, these devices may be synchronized to the reference synchronization clock signal, to the generated time codes, and/or to the package control signals.

Figure 6:
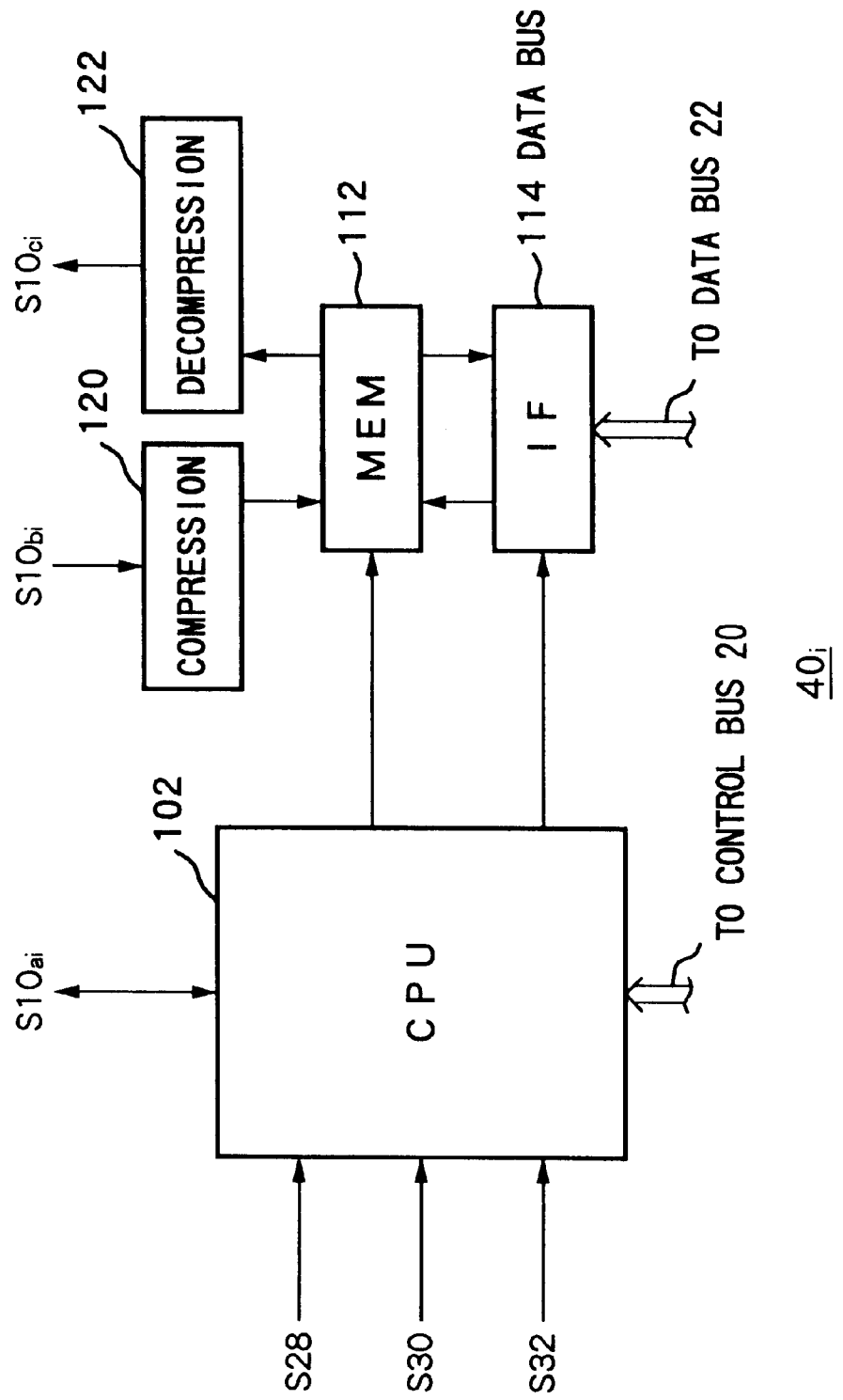
FIG. 6 is a block diagram of the A/V data I/O device shown in FIG. 2 in accordance with another embodiment of the present invention.

FIG. 6 is a block diagram of A/V data I/O device 40 in accordance with another embodiment of the present invention. Data I/O device 40 is similar to data I/O device 10, previously discussed, in that it is comprised of a CPU 102, a memory 112 and a data bus interface 114. However, data I/O device 40 further is comprised of a compression circuit 120 and a decompression circuit 122 which compresses and decompresses, respectively, video and audio signals supplied to and transmitted from data I/O device 40.

In accordance with this embodiment of the present invention, video and audio data supplied from an external device 2 during a recording operation of the present invention are compressed in compression circuit 120 to produce compressed video and audio data. The compressed data is transmitted and stored on the record medium in the manner previously discussed. Similarly, compressed video and audio data stored on the record medium is reproduced and transmitted to decompression circuit 122 which decompresses the data to produce uncompressed video and audio data and which supplies the uncompressed video and audio data to external device 2. Compression circuit 120 is operable to encode digital video and audio data in any manner well-known in the art to produce encoded and compressed, for example, MPEG compressed, video and audio signals. The operation of apparatus for recording and reproducing video data to and from a record medium in which the video data (and audio data) is compressed prior to recording, and decompressed upon reproducing stored data is similar to the operation of FIG. 2, as previously discussed, and, therefore, further description thereof is omitted herein.

In accordance with the present invention, any of the above-discussed embodiments of apparatus for recording and reproducing video data to and from a record medium may be expanded to communicate with an increasing number of external devices by providing a respective A/V data I/O device (either device 10 or device 40) for each external device that is desired to be coupled to the server system of the present invention.

For example, the apparatus may be configured to record SCSI (Small Computer Systems Interface) type signals on the record medium even though the external devices are supplying non-SCSI type signals. In such a case, the apparatus may include a SCSI interface for converting the non-SCSI signals to SCSI signals for purposes of recording on the recording medium.

While the present invention has been particularly shown and described in conjunction with preferred embodiments thereof, it will be readily appreciated by those of ordinary skill in the art that various changes may be made without departing from the spirit and scope of the invention. For example, although the present invention has been shown and described as being a server system of a television broadcasting system, the present invention is not limited to only television broadcasting and may be applied to other types of systems which require the recording and/or reproducing of data to and from a record medium.

As another example, although the present discussion is directed to recording and reproducing video and audio data on a record medium, for example, a magnetic tape, included in recording/reproducing device 26, the present invention is not limited solely to recording and reproducing data to and from magnetic tapes and may record and reproduce data to and from other types of recording medium including hard and/or floppy diskettes, magneto-optical diskettes, semiconductive memory, etc. Further, the present invention is not limited solely to recording and reproducing data to and from a single record medium and may utilize multiple record mediums, for example, by having recording/reproducing device 26 be comprised of plural such devices which record and reproduce data to and from multiple record mediums.

Still further, although the apparatus of the present invention has been shown and described as being synchronized to the external devices, asynchronous operation of the present invention is easily accomplished simply by not utilizing a synchronous/asynchronous converter.

Therefore, it is intended that the appended claims be interpreted as including the embodiments described herein, the alternatives mentioned above, and all equivalents thereto.

What is claimed is:

1. Apparatus for reproducing video data from a record medium, comprising:

reproducing means for reproducing video data from a record medium in accordance with a reproducing request control signal;

a plurality of output control means, each including programmed control means for outputting a respective reproducing request control signal in response to receipt of an external reproduction request supplied by a respective external device coupled to the respective output control means;

control bus means for supplying to the reproducing means the reproducing request control signal output from one of the output control means;

data bus means for supplying the video data reproduced by said reproducing means to the respective output control means which output the reproducing request control signal;

a server manager system for supplying respective management control signals to each of said output control means in accordance with a predetermined reproduction schedule, wherein each of said output control means supplies a respective output control signal corresponding to the supplied respective management control signal to the respectively coupled external device; and a time code generator for generating time codes based on a reference clock signal received from a source external to the reproducing apparatus, said time codes indicating the time of reproduction of said video data and being used to synchronize said reproducing means and said plurality of output control means.

2. The apparatus of claim 1, wherein said external reproduction request identifies a desired video data; and said record medium includes a plurality of addresses in which video data is stored; and said apparatus further comprises means for identifying an address in said record medium at which the desired video data is located; and wherein the respective output control means outputs the reproducing request control signal including the identified address; and said reproducing means is operable to reproduce from the record medium the desired video data from the identified address included in the reproducing request control signal.

3. The apparatus of claim 1, wherein said reproducing means is comprised of a plurality of hard drives.

4. The apparatus of claim 1, wherein compressed video data is stored in said record medium; and each of said output control means includes means for decompressing the compressed video data reproduced by said reproducing means and outputting the decompressed video data to the respectively coupled external device.

5. The apparatus of claim 1, wherein an external device coupled to one of said output control means is a video data editing device, and an external device coupled to another one of said output control means is an on-air type device.

6. The apparatus of claim 1, wherein the reproducing means is an asynchronous type device; said apparatus further comprising converting means for converting asynchronous signals output from said reproducing means to synchronous signals whereby an amount of time between the output of the reproducing request control signal from a respective output control means and receipt of the reproduced video data by the respective output control means is constant.

7. Apparatus for reproducing video data from a record medium, comprising:

a plurality of programmed input/output control means each for receiving a respective external request signal from a respective external device, generating a respective reproduction request signal in response to receipt of said respective external request signal and outputting the respective reproduction request signal, and for receiving reproduced data and outputting the received reproduced data to said respective external device;

storage control means for receiving the reproduction request signal and supplying a reproduction control signal in response thereto to the respective programmed input/output control means which output the reproduction request signal, the respective programmed input/output control means supplying in response to the reproduction control signal a reproduction initiate signal;

storage means including said record medium for reproducing video data from said record medium in accordance with said reproduction initiate signal and outputting the reproduced video data to the respective programmed input/output control means which output the reproduction initiate signal;

a server manager system for supplying respective management control signals to each of said input/output control means in accordance with a predetermined reproduction schedule, wherein each of said input/output control means supplies a respective output control signal corresponding to the supplied respective management control signal to the respectively coupled external device; and a time code generator for generating time codes based on a reference clock signal received from a source external to the reproducing apparatus said time codes indicating the time of reproduction of said video data and being used to synchronize said storage means and said plurality of programmed input/output control means.

8. The apparatus of claim 7, wherein the external request signal identifies a desired video data; said storage control means supplies a reproduction control signal identifying an address in said record medium at which the desired video data is located; the respective programmed input/output control means supplies a reproduction initiate signal including the identified address to the storage means; and the storage means is operable to reproduce from the record medium the desired video data from the identified address included in the reproduction initiate signal.

9. The apparatus of claim 7, wherein the respective programmed input/output control means supplies a reproduction permit signal to the respective external device in response to the reproduction control signal supplied by the storage control means, and supplies said reproduction initiate signal to said storage means after receipt of a reproduce command signal from the respective external device.

10. Apparatus for recording video data onto a record medium, comprising:

a plurality of input control means, each including programmed control means for outputting a respective recording request control signal in response to receipt of an external recording request supplied by a respective external device coupled to the respective input control means, and for receiving video data from said respective external device;

recording means for recording supplied video data onto a record medium in accordance with the recording request control signal;

control bus means for supplying to the recording means the recording request control signal output from one of the input control means;

data bus means for supplying the video data received by said one of the input control means to the recording means;

a server manager system for supplying respective management control signals to each of said input control means, wherein each of said input control means supplies a respective input control signal corresponding to the supplied respective management control signal to the respectively coupled external device; and a time code generator for generating time codes based on a reference clock signal received from a source external to the recording apparatus, said time codes being added to said video data prior to recording and being used to synchronize said recording means and said plurality of input control means.

11. The apparatus of claim 10, wherein said record medium includes a plurality of addresses; and said apparatus further comprises means for identifying an address in said record medium at which the received video data is to be stored; and wherein the respective input control means outputs the recording request control signal including the identified address; and said recording means is operable to record on the record medium the supplied video data at the identified address included in the recording request control signal.

12. The apparatus of claim 10, wherein said recording means is comprised of a plurality of hard drives.

13. The apparatus of claim 10, wherein each of said input control means includes means for compressing video data supplied by the respectively coupled external device.

14. The apparatus of claim 10, wherein an external device coupled to one of said output control means is one of a video data editing device, video tape recorder and a camera.

15. The apparatus of claim 10, further comprising converting means for converting said video data supplied by each of said external devices to SCSI-type signals prior to being recorded on the record medium by the recording means.

16. Apparatus for recording video data onto a record medium, comprising:

a plurality of programmed input/output control means each for receiving a respective external request signal from a respective external device, generating a respective recording request signal in response to receipt of said respective external request signal and outputting the respective recording request signal, and for receiving video data from said respective external device and outputting the received video data;

storage control means for receiving the recording request signal and supplying a recording permit signal in response thereto to the respective programmed input/output control means which output the recording request signal, the respective programmed input/output control means supplying in response to the recording permit signal the received video data;

storage means for recording the video data output by a respective one of said programmed input/output control means on said record medium;

a server manager system for supplying respective management control signals to each of said input/output control means, wherein each of said input/output control means supplies a respective input control signal corresponding to the supplied respective management control signal to the respectively coupled external device; and a time code generator for generating time codes based on a reference clock signal received from a source external to the recording apparatus said time codes being added to said video data prior to recording and being used to synchronize said storage means and said plurality of input/output control means.

17. The apparatus of claim 16, wherein said storage control means supplies a recording permit signal identifying an address in said record medium at which video data is to be recorded in response to receiving the recording request signal; the respective programmed input/output control means supplies a recording initiate signal including the identified address to the storage means; and the storage means is operable to record on the record medium the video data output from the respective programmed input/output control means at the identified address included in the recording initiate signal.

18. The apparatus of claim 17, wherein said storage control means is operable to supply a recording region request signal to said storage means in response to receiving the recording request signal; said storage means supplies a recording region identification signal to said storage control means identifying an address in said record medium at which said video data is to be recorded; and said storage control means supplies to the respective programmed input/output control means said recording permit signal including said address identified in said recording region identification signal.

19. The apparatus of claim 16, wherein the respective programmed input/output control means supplies a recording allowance signal to the respective external device in response to the recording permit signal supplied by the storage control means, and receives the video data from the respective external device in response to the supply of the recording allowance signal.

20. Method of reproducing video data from a record medium, comprising the steps of:

receiving by one of a plurality of output control devices an external reproduction request supplied by a respective external device;

outputting by the output control device which received the external reproduction request a reproducing request control signal;

supplying the reproducing request control signal to a reproducing device;

reproducing in the reproducing device video data from a record medium in accordance with the reproducing request control signal;

supplying the reproduced video data to the output control device which supplied the reproducing request control signal;

supplying the reproduced video data from the output control device to the external device;

supplying via a server manager system respective management control signals to each of said output control devices in accordance with a predetermined reproduction schedule, wherein each of said output control devices supplies a respective output control signal corresponding to the supplied respective management control signal to the respectively coupled external device; and generating time codes based on a reference clock signal that is distinct from said video data, said time codes indicating the time of reproduction of said video data and being used to synchronize said reproducing device and said plurality of output control devices.

21. The method of claim 20, wherein the external reproduction request identifies a desired video data; and said method further comprises the step of identifying an address in the record medium at which the desired video data is located; and wherein the reproducing request control signal includes the identified address; and said reproducing step is carried out by reproducing from the record medium the desired video data from the identified address included in the reproducing request control signal.

22. The method of claim 20, wherein compressed video data is stored in said record medium, and the method further comprises the step of decompressing compressed video data supplied to the output control device to produce uncompressed video data.

23. The method of claim 20, further comprising the step of converting signals output from the reproducing device to synchronous signals whereby an amount of time between the output of the reproducing request control signal and the supply of the reproduced video data to the output device is constant.

24. Method of recording video data onto a record medium, comprising the steps of:

receiving by one of a plurality of input control devices an external recording request supplied by a respective external device;

outputting by the input control device which received the external reproduction request a recording request control signal;

receiving, by the input control device which received the external recording request, video data from the external device;

outputting by the input control device the received video data;

supplying to a recording device the output recording request control signal over a control bus;

supplying to the recording device the output video data over a data bus;

recording in the recording device the video data supplied over the data bus onto a record medium in accordance with the recording request control signal supplied over the control bus;

supplying via a server manager system respective management control signals to each of said input control devices, wherein each of said input control devices supplies a respective input control signal corresponding to the supplied respective management control signal to the respectively coupled external device; and generating time codes based on a reference clock signal that is distinct from said video data, said time codes being added to said video data prior to recording and being used to synchronize said recording device and said plurality of input control devices.

25. The method of claim 24, further comprising the steps of identifying an address in the record medium at which the received video data is to be stored; and wherein the output recording request control signal includes the identified address; and said recording step is carried out by recording on the record medium the supplied video data at the identified address included in the recording request control signal.

26. The method of claim 24, further comprising the step of compressing the received video data to produce compressed video data; and wherein the step of recording is carried out by recording the compressed video data on the record medium.

27. The method of claim 24, further comprising the step of converting the received video data to an SCSI-type signal; and wherein the step of recording is carried out by recording the SCSI-type signal on the record medium.

28. The apparatus of claim 16, wherein each of said programmed input/output control means includes means for adding time codes to the video data received from the respective external device when the received video data does not include time codes.

* * * * *